US009306331B2

(12) United States Patent
Lange et al.

(10) Patent No.: US 9,306,331 B2
(45) Date of Patent: Apr. 5, 2016

(54) SELF-ALIGNING CONNECTOR FOR DATA AND/OR POWER TRANSMISSION

(71) Applicant: Airbus Operations GmbH, Hamburg (DE)

(72) Inventors: Roland Lange, Nottensdorf (DE); Stefan Ebeling, Wilhelmshaven (DE); Jens Gärtner, Hamburg (DE); Andreas Köhler, Hamburg (DE); Raj Kotian, Hamburg (DE); Ralph Hoffmann, Werle (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/306,338

(22) Filed: Jun. 17, 2014

(65) Prior Publication Data

US 2014/0370720 A1     Dec. 18, 2014

(30) Foreign Application Priority Data

Jun. 17, 2013 (EP) .................................... 13172367

(51) Int. Cl.
*H01R 13/631* (2006.01)
*B60R 16/023* (2006.01)

(52) U.S. Cl.
CPC .......... *H01R 13/6315* (2013.01); *B60R 16/023* (2013.01); *H01R 2201/26* (2013.01)

(58) Field of Classification Search
CPC .................................................. H01R 13/6315
USPC .......................................... 439/34, 246–248
See application file for complete search history.

(56) References Cited

U.S. PATENT DOCUMENTS

| 2,882,510 | A | 4/1959 | Colvin |
| 4,940,417 | A | 7/1990 | Hyogo et al. |
| 8,585,421 | B2 * | 11/2013 | Yamaguchi et al. .......... 439/248 |
| 2007/0082537 | A1 | 4/2007 | Chien et al. |
| 2009/0068870 | A1 | 3/2009 | Mezhinsky |
| 2010/0050855 | A1 | 3/2010 | Kubinski et al. |

OTHER PUBLICATIONS

English Translation of FR 2950605, Published Apr. 1, 2011, Translation printed May 18, 2015.*
EP 13 17 2367 search report (Oct. 24, 2013).

* cited by examiner

*Primary Examiner* — James Harvey
*Assistant Examiner* — Matthew T Dzierzynski
(74) *Attorney, Agent, or Firm* — Lerner, David, Littenberg, Krumholz & Mentlik, LLP

(57) ABSTRACT

A self-aligning connector for data and/or power transmission includes a base plate, a plurality of data and/or power contact elements arranged on the base plate, first and second positioning means attached to the base plate, a mounting means and a frame assembly connecting the base plate to the mounting means and comprising a plurality of frames. Each frame is directly connected to exactly two elements selected from a group consisting of the plurality of frames, the mounting means and the base plate. Each frame is tiltable at least about one axis and/or displaceable in at least one direction with respect to each element it is directly connected to. A connector assembly includes a first self-aligning connector and a second connector. A vehicle includes a first compartment and a second compartment separated by a wall, a bellows assembly and the connector assembly.

15 Claims, 3 Drawing Sheets

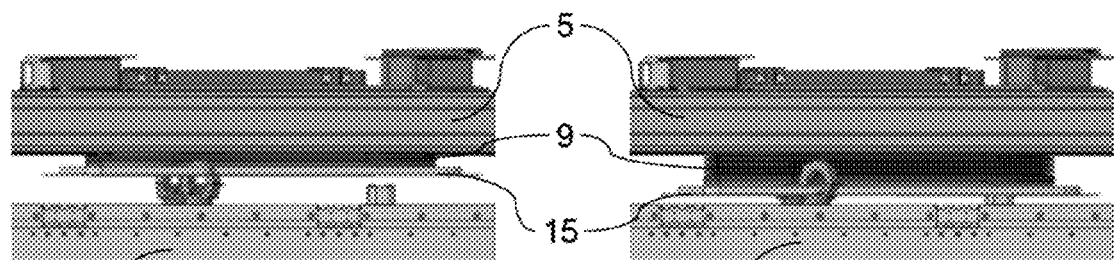
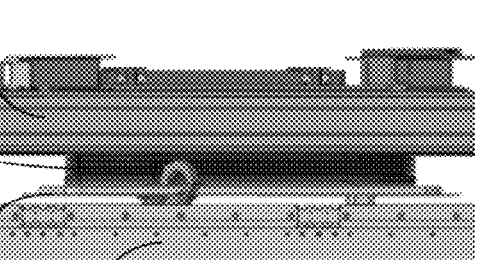
Fig. 1a
Fig. 1b
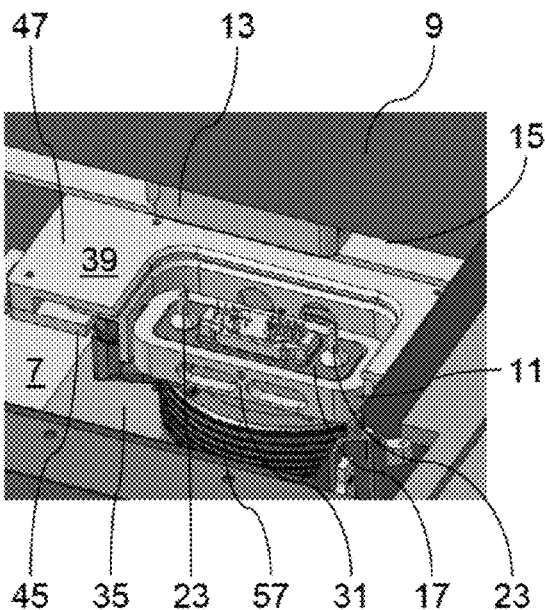
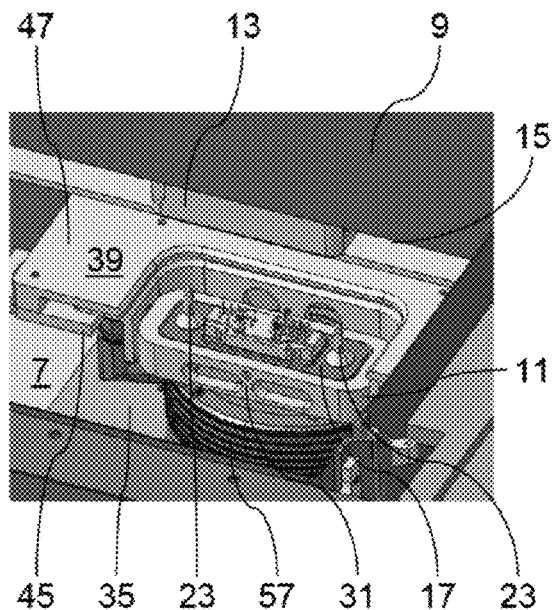
Fig. 2a
Fig. 2b

SELF-ALIGNING CONNECTOR FOR DATA AND/OR POWER TRANSMISSION

FIELD OF THE INVENTION

The present invention relates to a self-aligning connector for data and/or power transmission, a connector assembly comprising a first connector and a second connector and a vehicle comprising a first and a second compartment separated by a wall, a bellows assembly and a connector assembly.

BACKGROUND OF THE INVENTION

Space is a limited resource on board aircraft. The cost effectiveness of passenger aircraft, however, is directly related to the number of passengers that can be transported with an aircraft. One option for gaining additional space for seats in a passenger cabin of the aircraft is to relocate the storage space for food, beverages and further catering related goods from the passenger cabin to a storage means such as a unit load device in the cargo bay of the aircraft. It is preferred to use an exchangeable storage means such that the aircraft can be rapidly reequipped with new food and beverages by simply exchanging the storage means.

This does, however, require a flexible connecting means for connecting the passenger cabin i.e. a first compartment of the aircraft with the storage means located in the cargo bay i.e. a second compartment of the aircraft. The connecting means has to be extendable from the inside or a floor portion of the first compartment and needs to provide both a sealed connection between the first compartment and the storage means and a power and a data connection to the storage means. Now, as space is precious on board aircraft only a very small distance needs to be covered by the connecting means when it extends from the wall separating the first and the second compartment to a storage means e.g. about 10 cm. However, at the same time the storage means can only be accurately positioned up to approximately 10 mm due to tolerances of storage means mounting means and relative movements of portions of the aircraft due to forces occurring during operation.

Thus, a connector providing data and power transmission does not only have to be self-aligning with a mating counterpart on a short distance, it also has to provide a robust connection that withstands the loads occurring in operation of an aircraft. Such a connection can easily be established and maintained if only a few electrical connections are required. The connecting elements can simply be dimensioned such that even an approximate alignment already provides sufficient electrical conductance and, thus, allows for power transmission. Further, the dimension of the connecting elements can usually be chosen sufficiently robust to maintain a connection even under high loads.

However, if a plurality of data and/or electrical connections is required and the space for contact elements is not available in abundance, the contacts elements will eventually be of delicate dimensions. Consequently, they require an exact alignment of the connectors and can carry only small loads acting on the connection themselves. However, the robustness of the connection may commonly not by compromised and, thus, other means have to be provided that automatically align mating connectors and provide a robust connection in which the contact elements do not carry high loads.

BRIEF SUMMARY OF THE INVENTION

An aspect of the present invention provides a self-aligning connector for data and power transmission correctly aligning itself to provide a robust data and/or power connection between a first compartment of an aircraft and a storage means located in a second compartment of an aircraft wherein the distance available for self-aligning the connector is limited.

An aspect of the present invention solves this problem by a self-aligning connector for data and power transmission comprising a base plate extending along a base plane, a plurality of data and/or power contact elements arranged on the base plate, first positioning means attached to the base plate and adapted for engaging with mating first positioning means of a mating connector for achieving a pre-positioning of the base plate with respect to the mating connector, second positioning means attached to the base plate and adapted for engaging with mating second positioning means of the mating connector for achieving a fine positioning of the base plate with respect to the mating connector, a mounting means for mounting the base plate to a structure and a frame assembly connecting the base plate to the mounting means and comprising a plurality of frames, wherein each frame is directly connected to exactly two elements selected from a group comprising the plurality of frames, the mounting means and the base plate. The base plate is directly connected to exactly one frame and the mounting means is directly connected to exactly one frame. Each frame is tiltable at least about one axis and/or displaceable in at least one direction with respect to each element it is directly connected to, such that the base plate can be tilted in three degrees of freedom with respect to the mounting means and translationally be displaced in three degrees of freedom with respect to the mounting means.

The self-aligning connector according to an embodiment of the present invention comprises three different groups of parts: the plug parts comprising the data and/or power contact elements and positioning means, a mounting part providing a rigid connection to an external structure not forming part of the connector and an intermediate frame assembly providing the flexibility required for a self-alignment of the connector.

The plug parts comprise a base plate that extends along a base plane. The base plate can, for example, at least partly be formed from an elastic material and can advantageously be deformed in itself for additionally compensating limited displacements between the connector according to an embodiment of the present invention and a mating counterpart. The base plate is not necessarily flat but may also comprise levels of different height above the base plane which accommodate different elements of the plug assembly or different plug parts e.g. a first positioning means can be arranged on a different level then a second positioning means and the data and/or power contact elements. The term data and/or power pin is not to be construed as representing only male electrical contacts extending out of the base plate requiring a mating female contact receptacle in a mating connector. In contrary, it is also possible that the contact elements are female contacts receiving male connectors from the mating connector. It is also conceivable that the data contact elements do not provide electric connections but that data is transmitted via light signals. However, in a preferred exemplary embodiment the data and/or power contact elements are male electric contacts or pins protruding in a transverse direction to the base plane out of the base plate. Such pins advantageously additionally serve as a third positioning means for obtaining and/or maintaining a rigid and tight connection between a self-aligning connector according to an embodiment of the present invention and a mating connector.

Further, the plug parts comprise first and second positioning means adapted for positioning the self-aligning connector with respect to a mating connector. In particular, the first and second positioning means in operation tilt and shift the position of the base plate with respect to the mounting means which is rigidly connected to an external structure such that a connection between a connector according to the present invention and a mating connector can be automatically established.

The first positioning means are adapted for engaging with mating first positioning means of a mating connector, their counterparts, whereby the connectors are pre-positioned or pre-aligned. To this end the first positioning means are formed such that they can engage with their respective counterparts even if the connectors are not precisely aligned. In an exemplary preferred embodiment the first positioning means can engage with their counterparts if the connectors are misaligned by +/−10 mm in any direction parallel to the base plate and tilted in any of three degrees of rotational freedom by +/−5°.

In consequence, the first positioning means are adapted to align a connector according to the present invention in operation only roughly with its mating counterpart. The first positioning means can, for example, in operation align the connectors with a precision of +/−5 mm parallel to the base plane and by a tilt angle of +/−5°. The second positioning means are preferably adapted to engage with mating second positioning means when the connectors are aligned within the accuracy defined by the first positioning means. The second positioning means are further adapted to tilt and shift the base plate with respect to the mounting means such that data and/or power contact elements on the base plate can in operation engage with respective data and/or power contact elements provided on a mating connector.

In between the base plate and the mounting means a frame assembly is arranged that provides a connection between the latter. In other words, the base plate can be mounted to an external structure via the frame assembly and the mounting means. A connector according to an embodiment of the present invention is a nested construction in which the mounting means is directly connected to exactly one frame and the base plate is also directly connected to exactly one frame. Each frame between the base plate and the mounting means is directly connected to either exactly two frames or to exactly one frame and one of the base plate and the mounting means. Further, each frame can be tilted about at least one axis and/or displaced in at least one direction with respect to the elements it is directly connected to. Various different frame assemblies are conceivable that all enable a displacement of the base plate with respect to the mounting means in three degrees of freedom and a rotation of the base plate with respect to the mounting means also in three degrees of freedom. Preferred embodiments of the frame assembly are subject of the following preferred embodiments of a self-aligning connector.

Thus, a connector according to an embodiment of the present invention can advantageously establish a data and/or power connection between two structures that cannot be aligned precisely with respect to one another. The connection established by a connector according to an embodiment of the present invention is further insensitive to a limited displacement or movement of the structure to which the connector is established relative to a mating connector. For example, retaining means provided for unit load devices in the cargo bay of an aircraft cannot inhibit all movement of the unit load device, i.e. a unit load device can be displaced under changing loads in flight manoeuvres by +/−5 mm. Such displacement can advantageously be compensated by a connector according to an embodiment of the present invention.

The connector does advantageously not require any electrical or hydraulic actuation means aligning either of the connectors or even any kind of electrical or optical sensor system to determine relative connector positions. Hence, it can advantageously be mounted to an initially power-less structure that receives power through the connector only after a connection has been established with a mating counterpart. By using a plurality of first and second positioning means a step-wise alignment of the connector with a mating counterpart is advantageously obtained on a short distance. Further, the positioning means and not the data and/or power contact elements advantageously take up loads acting on the connector in operation.

In a preferred embodiment the first positioning means is formed by at least two spikes or pins extending transversely to the base plate and in parallel to one another. It is even more preferred that the first positioning means extend perpendicularly to the base plate. It is advantageous to provide first positioning means comprising at least two spikes as a single spike having a circular cross-section cannot rotate the base plate about an axis perpendicular to the base plane and, thus, fully align the base plate.

It is preferred to form the second positioning means as at least two studs extending transversely to the base plate, in parallel to one another and in parallel to the spikes forming the first positioning means. A free end of each of the spikes forming the first positioning means is spaced further apart from the base plate than a free end of each of the spikes forming the second positioning means. It is even more preferred to form the second positioning means as three spikes. In a further preferred embodiment the spikes extend perpendicularly to the base plate. Thus, in operation the second positioning means advantageously do not engage with their counterparts before the first positioning means has sufficiently accurately aligned the connectors.

In a preferred embodiment the plurality of frames includes a central frame extending along a central plane. A first element of the two elements directly connected to the central frame can be tilted about a vertical axis extending perpendicular to the central plane and can be displaced along the central plane with respect to the central frame. This advantageously combines two degrees of freedom in a translational domain and one degree of freedom in a rotational domain in a single direct connection of two frames or elements. Hence, advantageously fewer frames are required to provide the rotational and translational degrees of freedom required to align the base plate.

The central frame preferably comprises a lower and an upper panel, wherein the first element is arranged between the lower and the upper panel and the panels preclude movement of the first element perpendicular to the central plane with respect to the central frame. In the preferred embodiment of the central frame the first element connected to the central frame is clenched or squeezed or held between two panels. The panels inhibit movement of the first element perpendicular to the central frame but allow full translational movement along the central plane and rotational movements about axes extending perpendicular to the central plane. In an exemplary preferred embodiment each panel has a planar or flat surface facing towards the respective other panel and extending parallel to the central plane.

It is further preferred that the central frame comprises a stud or shaft connecting the lower and the upper panel. The stud extends through an aperture or opening in the first element and a displacement and/or tilting of the first element with respect to the central frame is restricted by an engagement of the stud with an edge of the first element surrounding the aperture. In an exemplary embodiment a cross-section of the stud and the aperture is oval shaped for delimiting rotational movement. In another exemplary embodiment the central frame comprises two studs each extending through an aperture in the first element, wherein the first element comprises one or two apertures.

In a preferred embodiment the central frame comprises a plurality of biasing means for biasing the first element towards a neutral position with respect to the central frame. Out of the neutral position the first element can be displaced or translated by equal distances in opposing directions with respect to the central frame and/or tilted by equal angles in opposing directions about the vertical axis. Preferably, the central frame comprises four biasing means, which are more preferable leaf springs.

It is further preferred to directly connect the central frame to the mounting means, such that the central frame can be displaced with respect to the mounting means in a direction perpendicular to the central plane. In a further preferred exemplary embodiment biasing means a provided such that the base plate is biased towards a neutral position with respect to the central frame, wherein the base plane extends parallel to the central plane in the neutral position. Further, in an exemplary embodiment means are provided that delimit a tilting of the base plate with respect to the frame it is directly connected to, wherein these means may be the biasing means biasing the base plate towards a neutral position with respect to the central frame.

In a preferred embodiment the plurality of frames comprises a double-tilting frame, wherein the double-tilting frame can be tilted about different axes with respect to both elements it is directly connected to. Preferably, the double-tilting frame can be tilted about two different axes that are perpendicular to one another. The double-tilting frame is preferably directly connected to the base plate and even more preferably directly to an intermediate frame. In an exemplary preferred embodiment the intermediate frame is directly connected to the central frame as a first element of the frame assembly.

In another aspect the present invention relates to a connector assembly comprising a first connector according to any of the preceding embodiments and a second connector. The second connector comprises a plurality of data and/or power contact elements adapted for connection with the data and/or power contact elements of the first connector, first positioning means adapted for engaging with the first positioning means of the first connector and second positioning means adapted for engaging with the second positioning means of the first connector. In a preferred embodiment the respective second positioning means are adapted to engage in operation only after pre-positioning of the first and second connector by the respective first positioning means has been completed. The connector assembly shares the advantages of the respective embodiments of a first connector according to the present invention.

In a further aspect the present invention relates to a vehicle comprising a first and a second compartment separated by a wall. The vehicle further comprises a bellows assembly arranged in the wall and adapted for providing a data and/or power connection between the first compartment and a storage means located in the second compartment. The bellows assembly comprises a biasing means for automatically extending the bellows assembly from the wall towards the storage means. Further, the vehicle comprises a connector assembly wherein the first connector is mounted to one of the bellows assembly and the storage means and the second connector is mounted to the other of the bellows assembly and the storage means. A vehicle according to the present invention is advantageous for the same reasons as the respective embodiments of a connector assembly or a connector according to an embodiment of the present invention, respectively.

In a preferred embodiment the first compartment of the vehicle is a passenger compartment and the second compartment is a cargo compartment or cargo bay. The vehicle is preferably an aircraft.

BRIEF DESCRIPTION OF THE DRAWINGS

An exemplary embodiment of a vehicle according to the present invention comprising an exemplary embodiment of a connector assembly according to the present invention and an exemplary embodiment of a connector according to the present invention will now be described with reference to the drawings, wherein FIG. 1a is a sectional view of a section of an exemplary embodiment of a vehicle according to the present invention showing a bellows in a retracted position, FIG. 1b is a sectional view of the exemplary embodiment of FIG. 1a showing the bellows in an extended position, FIG. 2a is a perspective view of an exemplary embodiment of a connector assembly according to the present invention showing a first connector according to the present invention separated from a mating second connector, FIG. 2b is a perspective view of the exemplary embodiment of FIG. 2a showing the first and second connector in partial engagement, FIG. 3 is a perspective view of an enlarged section of the exemplary embodiment of the first connector of FIG. 2a, FIG. 4 is a top view of the first connector of FIG. 2a and FIG. 5 is a perspective view of the first connector of FIG. 2a.

DETAILED DESCRIPTION

Figure 3:
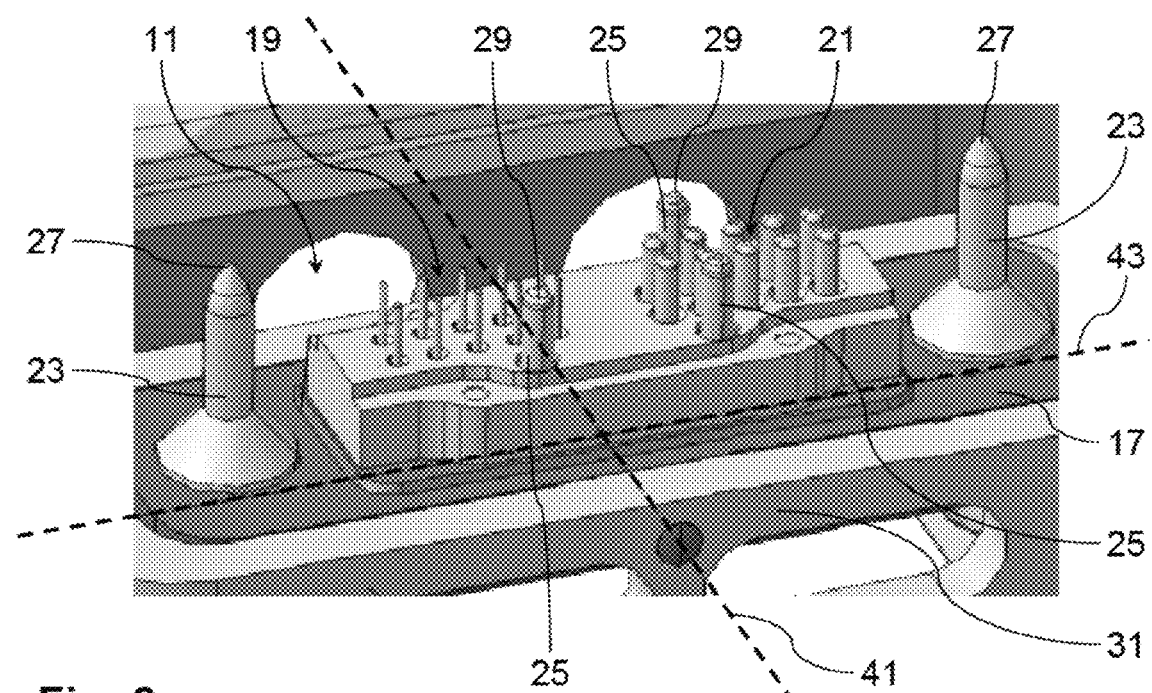

With reference to FIGS. 1a to 5 an exemplary preferred embodiment of a connecting means according to the present invention will now be described in detail. In the Figures like numerals refer to like elements.

FIGS. 1a and 1b show a section of an exemplary embodiment of a vehicle according to the present invention. The vehicle is an aircraft comprising a first and a second compartment 1, 3. The first compartment 1 is a passenger cabin and the second compartment 3 is a cargo compartment or cargo bay. The compartments 1, 3 are separated by a wall or cabin floor 5. The vehicle comprises a catering system in which food and beverages are not stored within the first compartment 1 but in a storage means 7 located in the second compartment 3. The storage means 7 is, for example, a LD3 or LD6 unit load device. A retractable passage between the first compartment 1 and the storage means 7 is provided in the form of a bellows arrangement 9 arranged in the wall 5 between the first and the second compartment 1, 3. The bellows arrangement 9 preferably comprises means for automatically extending it from a retracted to an extend position.

The bellows arrangement 9 does not only provide a passage for transporting goods between the compartment 1 and the storage means 7 but also supplies power and data to the storage means 7. To this end the vehicle comprises an exemplary preferred embodiment of a connection assembly according to the present invention that can be seen best in FIGS. 2a and 2b.

The connection assembly shown therein comprises a first connector 11 rigidly connected or mounted to the storage means 7 and a second mating connector 13 attached to a free end 15 of the bellows arrangement 9. In order to provide power and data to the storage means 7 the bellows arrangement 9 is extended from a retracted position as shown in FIGS. 1a and 2a to an extended position in which the first connector 11 engages with the mating second connector 13 and a power and data connection between the storage means 7 and the first compartment 1 is established. The connectors 11, 13 a not shown fully engaged in FIG. 2b but still slightly separated to maintain visibility of the structure of the first connector 11.

Automatically establishing a connection by means of a bellows arrangement 9 in an aircraft is challenging. The storage means 7 can only be positioned with a limited accuracy as the floor of a cargo bay of an aircraft is never completely even and the fastening or retaining means provided for unit load devices commonly only provide a limited rigidity and repeatability in locating the devices. Further, the connection can only be established once the aircraft is in flight and manual alignment of the connectors 11, 13 is impossible. Thus, at least one of the connectors 11, 13 has to be self-aligning such that the missing positioning accuracy of the storage means 7 can be compensated.

Figure 4:
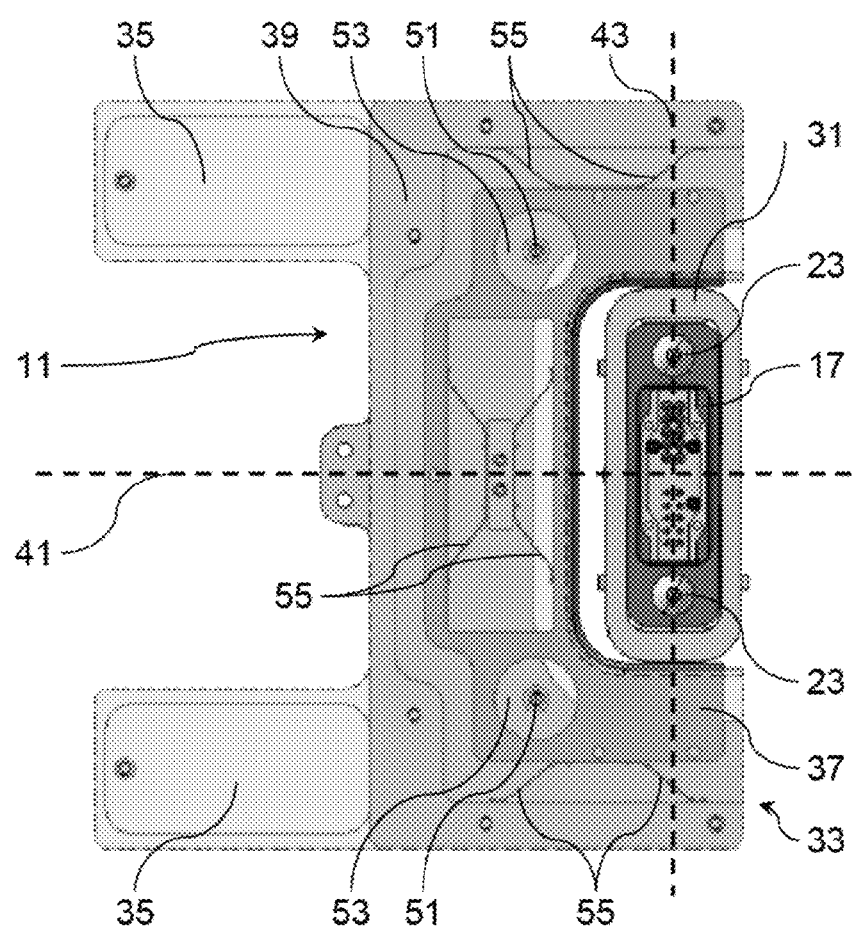
Figure 5:
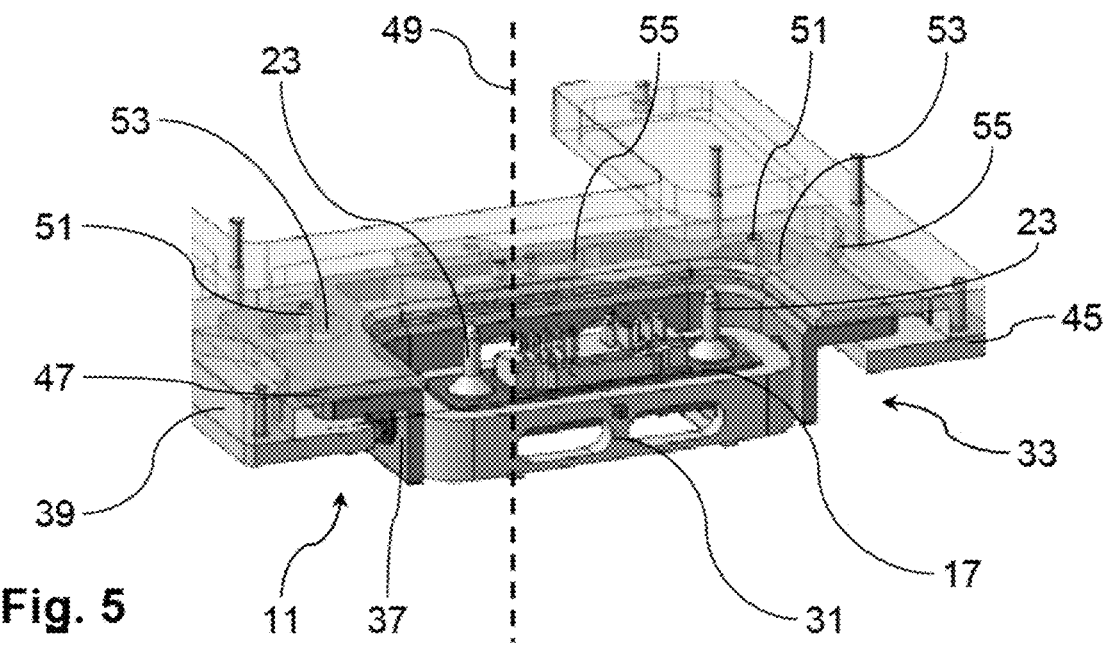

FIGS. 3 to 5 show the self-aligning first connector 11 in further detail. The connector 11 comprises a base plate 17 extending along a base plane. Arranged on the base plate 17 are a plurality of data contact elements 19 and power contact elements 21 in the form of data and power pins 19, 21. The data and power pins 19, 21 have a circular cross section and extend perpendicular to the base plane and parallel to one another. Further, first positioning means 23 and second positioning means 25 are also attached to the base plate 17. The first and second positioning means 23, 25 also have a circular cross section and extent perpendicular to the base plane and parallel to one another and parallel to the data and power pins 19, 21. The first and the second positioning means 23, 25 are formed as spikes or bolts 23, 25.

The first positioning means 23 are adapted for engaging with mating first positioning means of the mating second connector 13 for achieving a pre-positioning of the base plate 17 with respect to the mating connector 13. To this end the first positioning means 23 have pointed or tapering free ends 27 facing away from the base plate 17 which can engage with mating female receptacles at the second connector 13 even if the connectors 11, 13 are not exactly aligned with respect to one another. In the exemplary embodiment shown in the Figs. the first positioning means 23 are adapted to engage with their mating counterparts on the second connector 13 even if the connectors 11, 13 are misaligned by up to 10 mm in any direction parallel to the base plane. Advantageously two first positioning means 23 are provided on the base plate 17 to achieve a lateral shift and also a tilt about an axis perpendicular to the base plane when the connectors 11, 13 are pre-aligned by the first positioning means 23.

For a further fine positioning the second positioning means 25 on the base plate 17 engage with mating second positioning means on the second mating connector 13. The free ends 29 of the second positioning means 25 preferably extent not as far away from the base plate 17 as the free ends 27 of the first positioning means 23.

The base plate 17 is directly connected to a double-tilting frame 31 forming a part of a frame assembly 33 connecting the base plate 17 to a mounting means 35 providing a rigid connection of the connector 11 to a structure such as the storage means 7. The double-tilting frame 31 is further directly connected to an intermediate frame 37 which is in turn directly connected to a central frame 39. The central frame 39 is directly connected to the mounting means 35. In other words, the frame assembly 33 is formed by the double-tilting frame 31, the intermediate frame 37 and the central frame 39. Each of the frames 31, 37, 39 is either directly connected to exactly two frames 31, 37, 39 or directly to exactly one frame 31, 37, 39 and one of the base plate 17 and the mounting means 35. Thus, the frame assembly 33 provides a nested construction of frames 31, 37, 39.

The double-tilting frame 31 can be tilted about a first axis 41 with respect to the base plate 17. The first axis 41 extends in the base plane and perpendicular to a second axis 43 about which the double-tilting frame 31 is tiltable with respect to the intermediate frame 37. The frame assembly 33 comprises biasing means (not shown) for biasing the base plate 17 and the double-tilting frame 31 to a neutral position in which the base plane extends parallel to a plane spanned by the first and second axis 41, 43. Thus, by means of the double-tilting frame 31 the base plate 17 can advantageously be rotated or tilted in two degrees of freedom with respect to the mounting means 35 and, thus, the storage means 7.

The central frame 39 extends along a central plane and parallel to the second axis 43. It is formed by a lower and an upper panel 45, 47 in between which a first element 37 of the frame assembly 33 in form of the intermediate frame 37 is held. The lower and upper panel 45, 47 preclude movement of the intermediate frame 37 perpendicular to the central plane or in the direction of a vertical axis 49. However, the intermediate frame 37 can be displaced or translated along the central plane with respect to the central frame 39 and can also be rotated or tilted about the vertical axis 49 with respect to the central frame 39. The connection of the central frame 39 and the intermediate frame 37, therefore, provides two degrees of translational freedom to the base plate 17 and one degree of rotational freedom.

Translational and rotational movement of the intermediate frame 37 with respect to the central frame 39 is limited by two studs 51 extending parallel to the vertical axis 49 and connecting the upper and the lower panel 45, 47. The studs 51 extent through apertures or openings 53 in the intermediate frame 37. In operation further displacement and rotation of the intermediate frame 37 is delimited when the edges of the intermediate frame 37 surrounding the apertures abut the studs 51. Thus, the studs 51 at the same time improve the rigidity of the central frame 39 and provide a limit of the rotational and translational movement of the frames 37, 39 with respect to one another. In a preferred embodiment the central frame 39 and the intermediate frame 37 can move up to +/−14 mm in either translational direction parallel to the central plane with respect to one another.

The stud and aperture arrangement 51, 53 limiting the movement of the frames 37, 39 in the exemplary embodiment comprises two studs 51 and two apertures 53. However, this is not to be construed as limiting the invention to such an arrangement. It is also conceivable that the arrangement comprises two studs 51 and a single aperture 53, wherein the aperture 53 does not have a circular outline, or a single stud and a single aperture 53, wherein the stud 51 and the aperture 53 do not have a circular outline or cross-section, respectively.

The central frame 39 further comprises biasing means 55 in form of leaf springs 55 biasing the intermediate frame 37 to a neutral position with respect to the central frame 39, such that the intermediate frame 37 can be displaced or translated parallel to the central plane by equal distances in opposing directions with respect to the central frame 39 and tilted by equal angles in opposing directions about the vertical axis 49 or an axis extending parallel to the vertical axis 49. In a preferred embodiment the frame assembly 33 further comprises biasing means for biasing the double-tilting frame 31 with respect to the intermediate frame 37 to a neutral position such that in the neutral position the first axis 41 is aligned parallel to the central plane and perpendicular to the vertical axis 49. Thus, if all of frames 31, 37, 39 and the base plate 17 are arranged in the respective neutral positions to one another the base plane extends parallel to the central plane.

The central frame 39 is connected to the mounting means 35 such that it can be displaced along the vertical axis 49 with respect to the mounting means 35 and a structure to which the mounting means 35 is connected. The structure providing translational movement between the central frame 39 and the mounting means 35 is protected by a bellows 57 shown in FIGS. 2a and 2b. The frame assembly 33 thus provides three degrees of translational and rotational freedom to the base plate 17 on a very limited space and facilitates automatic or self-aligning positioning of the connector 11 with respect to a mating second connector 13. Upon disconnection of the connectors 11, 13 the connector 11 according to the preferred embodiment shown in the Figs. advantageously automatically realigns itself in a neutral position for reconnection with another or the same second connector 13.

The invention claimed is:

1. A self-aligning connector for at least one of data and power transmission, the connector comprising:
   a base plate extending along a base plane;
   a plurality of data and/or power contact elements arranged on the base plate;
   first positioning means attached to the base plate and adapted for engaging with mating first positioning means of a mating connector for achieving a pre-positioning of the base plate with respect to the mating connector;
   second positioning means attached to the base plate and adapted for engaging with mating second positioning means of the mating connector for achieving a fine positioning of the base plate with respect to the mating connector;
   a mounting means for mounting the base plate to a structure; and
   a frame assembly connecting the base plate to the mounting means and comprising a plurality of frames, wherein each frame is directly connected to exactly two elements selected from a group consisting of the plurality of frames, the mounting means and the base plate,
   wherein the base plate is directly connected to exactly one frame and the mounting means is directly connected to exactly one frame,
   wherein each frame is tiltable at least about one axis and/or displaceable in at least one direction with respect to each element the frame is directly connected to, such that the base plate can be tilted in three degrees of freedom with respect to the mounting means and displaced in three degrees of freedom with respect to the mounting means.

2. The connector according to claim 1, wherein the first positioning means is formed by at least two spikes extending transversally to the base plate and in parallel to one another.

3. The connector according to claim 2, wherein the second positioning means is formed by at least two and preferably three spikes extending transversally to the base plate, in parallel to one another and in parallel to the spikes forming the first positioning means,
   wherein a free end of each of the spikes forming the first positioning means is spaced further from the base plate than a free end of each of the spikes forming the second positioning means.

4. The connector according to claim 1, wherein the plurality of frames includes a central frame extending along a central plane, wherein a first element of the two elements directly connected to the central frame can be tilted about a vertical axis extending perpendicular to the central plane and can be displaced along the central plane with respect to the central frame.

5. The connector according to claim 4, wherein the central frame comprises a lower and an upper panel, wherein the first element is arranged between the upper and the lower panel, the panels precluding movement of the first element perpendicular to the central plane with respect to the central frame.

6. The connector according to claim 5, wherein the central frame comprises a stud connecting the lower and the upper panel, wherein the stud extends through an aperture in the first element, wherein a displacement and/or tilting of the first element with respect to the central frame is delimited by an engagement of the stud with an edge of the first element surrounding the aperture.

7. The connector according to claim 4, wherein the central frame comprises a plurality of biasing means for biasing the first element towards a neutral position with respect to the central frame, wherein the first element in the neutral position can be displaced by equal distances in opposing directions with respect to the central frame (39) and/or tilted by equal angles in opposing directions with respect to the vertical axis.

8. The connector according to claim 7, wherein the central frame comprises four biasing means, preferably in the form of leaf springs.

9. The connector according to claim 4, wherein the central frame is directly connected to the mounting means and can be displaced with respect to the mounting means in a direction perpendicular to the central plane.

10. The connector according to claim 4, further comprising biasing means such that the base plate is biased towards a neutral position with respect to the central frame, wherein the base plane extends parallel to the central plane in the neutral position.

11. The connector according to claim 1, wherein the plurality of frames comprises a double-tilting frame, wherein the double-tilting frame can be tilted about different axes with respect to both elements the double-tilting frame is directly connected to.

12. The connector according to claim 11, wherein the double-tilting frame is directly connected to the base plate and preferably an intermediate frame.

13. A connector assembly comprising:
   a first connector comprising:
   a base plate extending along a base plane;
   a plurality of data and/or power contact elements arranged on the base plate;
   first positioning means attached to the base plate and adapted for engaging with mating first positioning means of a mating connector for achieving a pre-positioning of the base plate with respect to the mating connector;
   second positioning means attached to the base plate and adapted for engaging with mating second positioning means of the mating connector for achieving a fine positioning of the base plate with respect to the mating connector;
   a mounting means for mounting the base plate to a structure; and
   a frame assembly connecting the base plate to the mounting means and comprising a plurality of frames, wherein each frame is directly connected to exactly two elements selected from a group consisting of the plurality of frames, the mounting means and the base plate, wherein the base plate is directly connected to exactly one frame and the mounting means is directly connected to exactly one frame, wherein each frame is tiltable at least about one axis and/or displaceable in at least one direction with respect to each element the frame is directly connected to, such that the base plate can be tilted in three degrees of freedom with respect to the mounting means and displaced in three degrees of freedom with respect to the mounting means, and a second connector, the second connector comprising:

a plurality of data and/or power contact elements adapted for connection with the data and/or power contact elements of the first connector, first positioning means adapted for engaging with the first positioning means of the first connector; and second positioning means adapted for engaging with the second positioning means of the first connector.

14. A vehicle comprising a first and a second compartment separated by a wall, a bellows assembly arranged in the wall and adapted for providing a data and power connection between the first compartment and a storage means located in the second compartment, the bellows assembly comprising a biasing means for automatically extending the bellows assembly from the wall towards the storage means; and a connector assembly comprising:

a base plate extending along a base plane;

a plurality of data and/or power contact elements arranged on the base plate;

first positioning means attached to the base plate and adapted for engaging with mating first positioning means of a mating connector for achieving a pre-positioning of the base plate with respect to the mating connector;

second positioning means attached to the base plate and adapted for engaging with mating second positioning means of the mating connector for achieving a fine positioning of the base plate with respect to the mating connector;

a mounting means for mounting the base plate to a structure; and a frame assembly connecting the base plate to the mounting means and comprising a plurality of frames, wherein each frame is directly connected to exactly two elements selected from a group consisting of the plurality of frames, the mounting means and the base plate, wherein the base plate is directly connected to exactly one frame and the mounting means is directly connected to exactly one frame, wherein each frame is tiltable at least about one axis and/or displaceable in at least one direction with respect to each element the frame is directly connected to, such that the base plate can be tilted in three degrees of freedom with respect to the mounting means and displaced in three degrees of freedom with respect to the mounting means, and a second connector, the second connector comprising:

a plurality of data and/or power contact elements adapted for connection with the data and/or power contact elements of the first connector, first positioning means adapted for engaging with the first positioning means of the first connector; and second positioning means adapted for engaging with the second positioning means of the first connector, wherein the first connector is mounted to one of the bellows assembly and the storage means and the second connector is mounted to the other of the bellows assembly and the storage means.

15. The vehicle according to claim 14, wherein the first compartment is a passenger compartment and the second compartment is a cargo compartment, the vehicle preferably being an aircraft.

* * * * *